Jan. 14, 1969  H. L. MASON  3,422,413
PRODUCTION MONITORING APPARATUS
Filed Nov. 2, 1964  Sheet 1 of 2
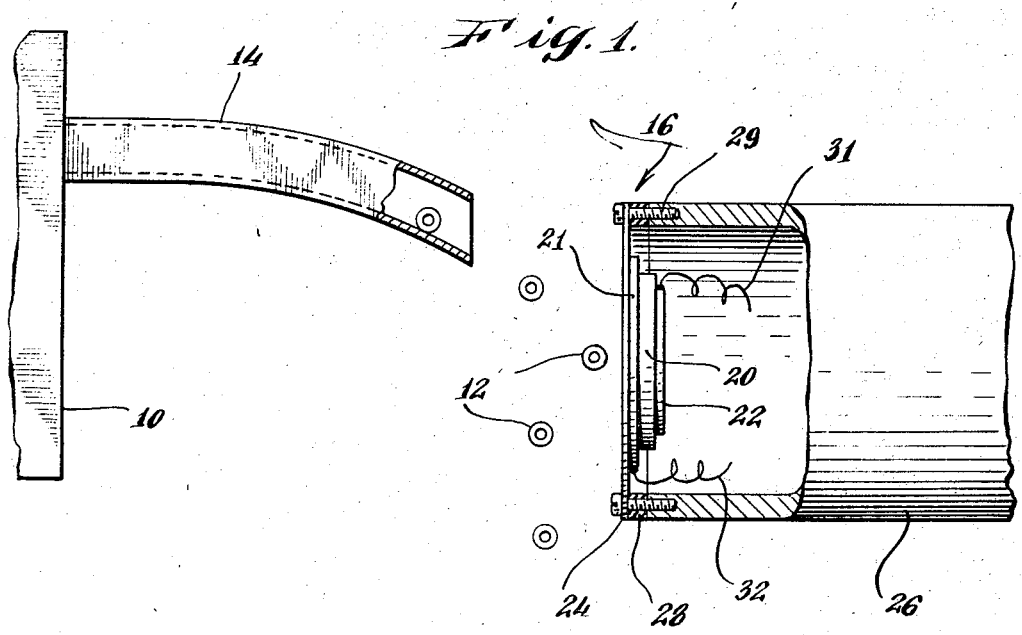
INVENTOR.
Harry L. Mason
BY
Blair & Buckles
ATTORNEYS.

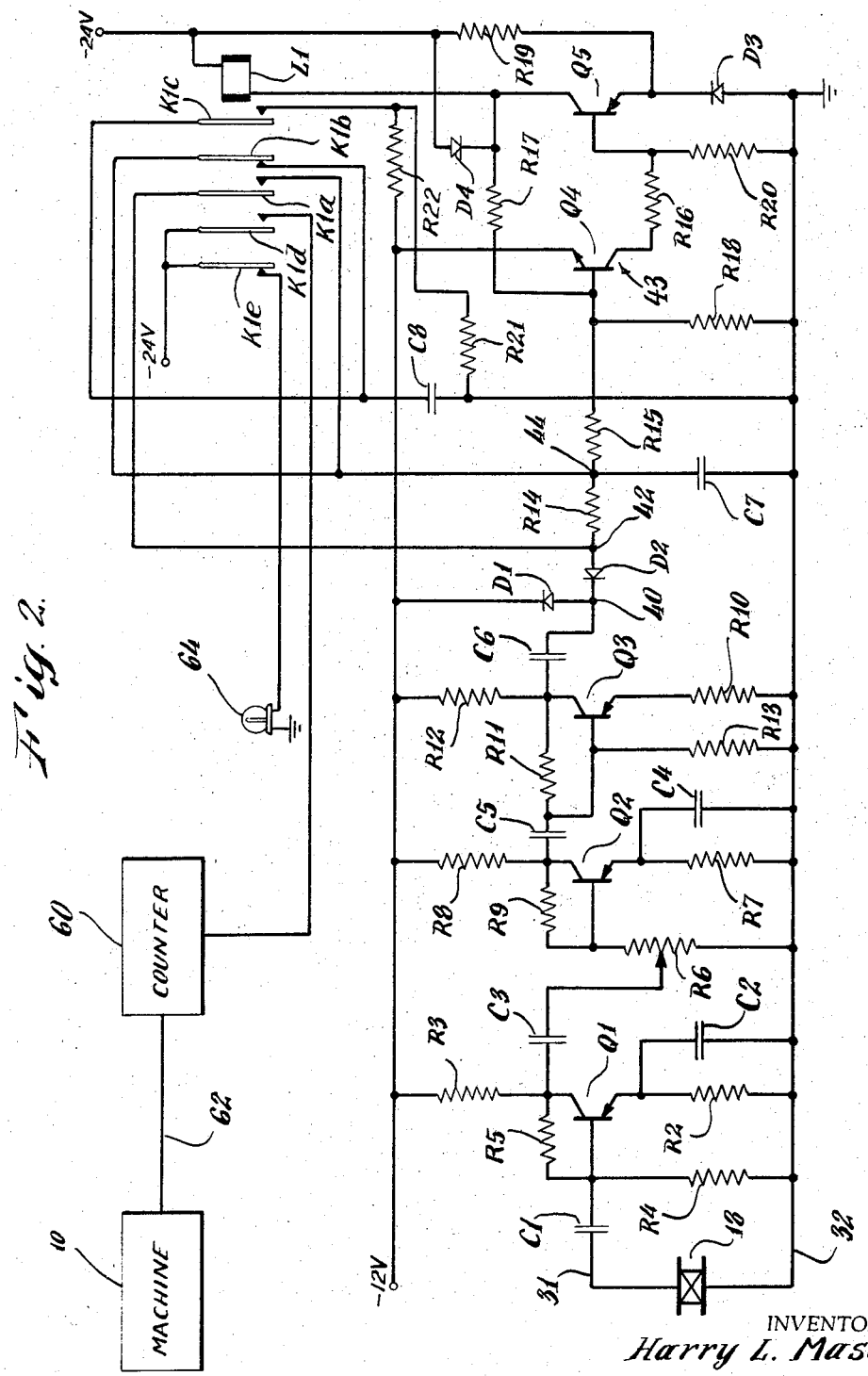

United States Patent Office 3,422,413
Patented Jan. 14, 1969

3,422,413
PRODUCTION MONITORING APPARATUS
Harry L. Mason, Noroton, Conn., assignor, by mesne assignments, to Vogue Instrument Corporation, a corporation of New York
Filed Nov. 2, 1964, Ser. No. 408,264
U.S. Cl. 340—213                    5 Claims
Int. Cl. G08b 21/00

The present invention relates to a condition responsive gate circuit for controlling functions relating to the condition. More particularly, it relates to apparatus for monitoring automated production machinery.

In many manufacturing situations, production machinery has been designed to operate substantially automatically. That is, the machinery operates without having to be controlled by an operator. However, an attendant is generally required to monitor the machinery in order to determine that it continues to operate satisfactorily. Typically, an attendant is charged with the responsibility of monitoring a plurality of automated production machines and thus each machine can be monitored only periodically, at best. Should any one machine begin to malfunction or for some reason discontinue producing parts, it may be some time before this fact comes to the attention of the attendant. Consequently, valuable production time is lost. It therefore becomes quite desirable to provide production monitoring apparatus to call the attendant's attention to the particular malfunctioning machine so efforts to rectify this situation can be immediately undertaken.

In the mass production of parts of relatively small physical size, monitoring of individual automated production machinery becomes particularly difficult. Sensing of the finished parts as they leave the production machine obviously provides the best indication that the machine is operating properly. However, physically small parts present a particularly difficult sensing problem. Individual small parts do not possess sufficient kinetic energy to trip a switch, for example. Typical electrical and optical sensing techniques are also unsatisfactory.

An additional problem is that such automated production machinery may malfunction temporarily and then cure itself. For example, the feed of part blanks into the machine may temporarily jam such that, during several operating cycles, no finished parts are produced. Then, in the normal course of events, the jam clears and normal production resumes. In these situations, production monitoring apparatus need not signal the attendant since no corrective measures are required.

Furthermore, the monitoring apparatus may fail to sense each and every finished part passing from the machinery. Apart from the difficulty of sensing small finished parts, there is also the problem that the parts may not follow the same path in leaving the machine. For example, the finished parts may leave through an output tube or the like, and therefore bounce repeatedly against the inner wall of the tube. The parts may exit from the output tube somewhat sporadically, and, in some instances several parts produced in successive machine production cycles may arrive at the part sensor of the monitoring apparatus at substantially the same time. In this situation, the sensor responds as though there was only one part produced rather than two.

It will thus be seen that automatic production monitoring apparatus should be able to discriminate between these situation where normal production exists or is only temporarily interrupted, and those situations where corrective measures are required.

In addition to monitoring production machinery so as to provide a signal indication in the event production ceases, it is also desirable to develop a count of the number of parts produced for production and inventory records. As previously noted, it is extremely difficult to sense finished parts of small physical size. Therefore, practical attempts to count the finished parts as they leave the production machinery have heretofore been wholly unsuccessful.

It is acordingly an object of my invention to provide a production monitoring apparatus for automated production machinery.

A further object is to provide apparatus of the above character capable of monitoring the production of articles of small physical size.

Another object is to provide production monitoring apparatus of the above character for developing a signal indication when the production machinery requires attention.

A further object is to provide production monitoring apparatus of the above character which includes novel sensing means for detecting the finished articles passing from production machinery.

A still further object is to provide production monitoring apparatus of the above character operating to control counting means in accumulating the number of articles produced.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller undertsanding of the nature and objects of the invention, reference should be had to the following detailed description taken in connection with the accompanying drawings, in which:

FIGURE 1 is a cross-sectional view of an article sensor constructed according to my invention for application in a monitoring apparatus for automated production machinery and FIGURE 2 is a detailed circuit schematic diagram of a production monitoring apparatus constructed according to my invention.

According to my invention, the finished parts passing from the automated production machinery are routed so as to impact against a piezoelectric sensor. The resulting mechanical stresses developed in a piezoelectric crystal cause the generation of electrical pickup signals. These pickup signals are amplified and then accumulated. After a predetermined number of impacts of finished parts occurring during a predetermined first time delay, the accumulation of pickup signals becomes effective to trigger a trigger circuit to a first state. As long as impacts are forthcoming, the trigger circuit is held in its first state to inhibit the energization of a signal indicator. When impacts terminate, indicating that parts are not being produced, the trigger circuit is held in its first state for a predetermined second time delay before it is permitted to revert to a normal second state and thereby enable energization of the signal indicator. However if, during this second time delay, impacts resume, the trigger circuit remains in its first state to continue to hold the signal indicator off.

According to an additional important feature of my invention, the trigger circuit also functions to control a counter implemented to count production cycles of the production machinery where each production cycle is capable of producing a known quantity of finished parts. When the trigger circuit is in its first state, the counter is enabled to count machine production cycles regardless of whether parts are produced or not. The second time delay, measured from the time impacts cease to the time when the trigger circuit reverts to its normal second state, is adjusted to equal the first time delay, measured from the time impacts begin to the time when the trigger circuit goes into its first state. Thus, the same number of production cycles which were not counted during the first time delay when parts were produced are counted during the second time delay when parts were not produced, so that, overall, the count accumulated by the counter corresponds to the number of parts actually produced.

Turning to FIGURE 1, an automated production machine, fragmentarily indicated at 10 operates to produce small finished parts such as, for example, eyelets indicated at 12. It will be appreciated, however, that my invention may be employed in conjunction with the production of a wide variety of small sized articles. The eyelets 12 produced by the machine 10 are routed through a tube 14 to impact against a sensor generally indicated at 16. The impact sensor 16 includes a piezoelectric transducer generally indicated at 18 and consisting of a piezoelectric crystal 20 with electrodes 21 and 22 affixed to opposing crystal surfaces. Electrode 21 may take the form of a thin metallic disc affixed to one surface of the crystal 20 while electrode 22, preferably in the form of thin metallic foil, is affixed to the opposite surface of the crystal. It will be appreciated that the crystal electrodes are exaggerated in size for the purpose of illustration. The piezoelectric transducer 18 is bonded, such as by a suitable adhesive, to the undersurface of a flexible metallic plate 24. The flexible plate 24 is placed over the open end of a housing generally indicated at 26. A rubber gasket 28 of high shock absorbing characteristics is inserted between the plate 24 and the housing 26, and screws, indicated at 29 and formed of a good mechanical damping material such as nylon, serve to affix the plate to the housing. The central portion of the flexible plate 24 is free to vibrate when parts 12 impact against it while spurious mechanical vibrations in the housing 26 are substantially isolated from the flexible plate.

The eyelets 12 passing through the tube 14 from the machine 10 impact against the upper surface of the flexible plate 24. The resulting mechanical vibrations induced in the plate 24 by each impact are communicated to the crystal 20 which, in turn, generates an electrical pickup signal appearing on leads 31 and 32 affixed to the transducer electrodes. The electrical pickup signal is in the form of an exponentially decaying sinusoidal wave train having a frequency determined by the mechanical resonant frequency of the crystal 20 and the plate 24 in combination.

Turning now to FIGURE 2, the piezoelectric transducer 18 of FIGURE 1 is connected to ground through lead 32 while the impact pickup signals appearing on lead 31 are applied through a capacitor C1 to the base of a transistor amplifier Q1. The emitter of transistor Q1 is connected to ground through the parallel combination of a resistor R2 and a capacitor C2 to provide a by-pass to improve the low frequency response. The collector of transistor Q1 is energized from a negative 12 volt supply through a resistor R3. The base of transistor Q1 is connected to ground through a resistor R4 while a feedback resistor R5 connected from collector to base serves to stabilize the base biasing voltage level. The amplified impact pickup signals appearing on the collector of transistor Q1 are applied through a capacitor C3 to the adjustable tap on a sensitivity control potentiometer R6, connected from the base of a second transistor amplifier Q2 to ground. Like transistor Q1, the emitter of transistor Q2 is connected to ground through the parallel combination of a resistor R7 and a capacitor C4. The collector of transistor Q2 is energized from the negative 12 volt supply through resistor R8 while a feedback resistor R9, connected from collector to base, stabilizes the base biasing voltage level.

The further amplified pickup signals appearing on the collector of transistor Q2 are coupled through a capacitor C5 to the base of a third transistor amplifier Q3. The emitter of transistor Q3 is grounded through a resistor R10 and a feedback resistor R11 is connected from its collector to its base. The collector of transistor Q3 is also connected to the negative 12 volt supply through a resistor R12. The base of transistor Q3 is connected to ground through resistor R13.

At standby, the collector of transistor Q1 is held at approximately a —5 volt level. With an impact pickup signal applied to its base, the resulting impact pickup signal on the collector of transistor Q1 is in the order of 3 volts peak-to-peak superimposed on this —5 volt standby level. By proper setting of the sensitivity control potentiometer R6, the impact pickup signal appearing on the collector of transistor Q2 is of sufficient peak-to-peak amplitude to drive transistor Q3 into saturation during one-half cycle and into cutoff during the next half cycle of each complete signal cycle. At standby, however, the collector of transistor Q3 is held at approximately —6 volts.

The impact pickup appearing on the collector of transistor Q3 is applied to a voltage doubling network consisting of a capacitor C6 and diodes D1 and D2. The collector of transistor Q3 is connected to a junction 40 by the capacitor C6. The anode of diode D1 is connected to junction 40 while its cathode is connected to the negative 12 volt supply. The cathode of diode D2 is connected directly to junction 40. At standby, capacitor C6 is charged through the diode D1 to approximately 6 volts, which is the voltage difference between the negative supply and the collector of transistor Q3. When the transistor Q3 is driven into saturation by an impact pickup signal, its collector swings to ground potential and the capacitor C6 charges to approximately 12 volts with junction 40 at —12 volts. Then the transistor Q3 is driven into cutoff and its collector swings negatively to —12 volts. As a result, junction 40 is driven further negative. During this time, the capacitor C6 is discharging through diode D2 to effectively constitute a current source whose output terminal is junction 42 at the anode of diode D2. This doubling network provides an increased current source voltage while employing the low voltage transistors Q1, Q2, and Q3.

Junction 42 is connected through a pair of series connected resistors R14 and R15 to the base of a transistor Q4. Transistor Q4 together with a transistor Q5 are interconnected so as to comprise a Schmitt trigger, generally indicated at 43. Accordingly, the collector of transistor Q4 is connected to the base of transistor Q5 through a resistor R16 while the collector of transistor Q5 is connected to the base of transistor Q4 through a resistor R17. The base of transistor Q4 is connected to ground by a resistor R18 while its emitter is connected directly to the negative 12 volt supply. The emitter of transistor Q5 is connected through a resistor R19 to a negative 24 volt supply which develops a voltage across a diode D3, connected from the emitter to ground, to hold this transistor cutoff when transistor Q4 is non-conducting. Transistor Q5 controls the energization of a relay operating coil L1 connected from its collector to the negative 24 volt supply. With transistor Q5 conducting, the voltage at its collector, being fed back through resistor R17 to the base of transistor Q4, serves to hold this transistor in conduction also by developing sufficient base biasing voltage across resistor R18. Then, with transistor Q4 conducting, the voltage at its collector develops a base biasing voltage across a resistor R20, connected from the base of transistor Q5 to ground, to maintain transistor Q5 in conduction. Accordingly, transistors Q4 and Q5 conduct simultaneously to characterize its normal or standby state. When the Schmitt trigger 43 is triggered to its second or triggered state, by means to be described, transistor Q4 is cut off and, by virtue of the cross-coupling resistors R16, R17 and diode D3, transistor Q5 is also rendered non-conductive to de-energize relay coil L1. With the Schmitt trigger 43 in its normal state such that transistor Q5 is in conduction, current flows through the relay operating coil L1 causing operation of a relay, generally indicated at K1. A diode D4 connected across the relay coil L1 serves to short out reverse voltages developed across the relay coil when normal current flow through it is interrupted.

The means for triggering the Schmitt trigger 43 from one state to the other will now be described. A capacitor C7 is connected from a junction 44 between resistors R14 and R15 to ground. A first relay contact K1a operated by relay K1 is connected across resistor R14. Junction 44 is also connected to ground through a second relay contact K1b of relay K1 and a capacitor C8. The grounded side of capacitor C8 is connected to the negative 12 volt supply through a resistor R21 and a resistor R22. A junction 46 between resistors R21 and R22 is connected to the other side of capacitor C8 through a third relay contact K1c of relay K1.

A counter 60 is implemented to count pulses appearing on its input line 62 developed by a suitable production cycle sensor associated with the automated production machine indicated at 10. The production cycle sensor may take the form of a simple switch which is operated by the production mechanism of the machine 10 each time the mechanism goes through a production cycle. Momentary closure of the switch then develops a pulse on line 62 to the counter 60. The production machine 10 is of the type which continues to execute production cycles regardless of whether parts are being produced or not. Thus, if there is a jam in the feed of the part blanks into the machine 10 or the supply of part blanks is exhausted, the machine 10 will continue to execute production cycles but finished parts will not be produced. The counter 60 is energized from the negative 24 volt supply through a fourth relay contact K1d operatively associated with the relay coil L1 of relay K1. As will be described in greater detail when the Schmitt trigger 43 is in its normal state, relay contact K1d is open and the counter 60 is disabled. At the same time however, a fifth relay contact K1e, also operatively associated with relay coil L1, is closed to energize a signal indicator lamp 64 from the negative 24 volt supply. The lamp 64, when energized, signals the attendant that the machine 10 is for some reason not producing parts.

As previously described, transistors Q4 and Q5 are conducting when the Schmitt trigger 43 is in its normal state. Consequently, current flows through the relay coil L1 to operate relay K1. With relay K1 operated, its contact K1a is open, K1b is closed, and K1c is open, as shown in FIGURE 2. At the same time, its contacts K1d and K1e are open and closed, respectively. Capacitors C7 and C8 are thus connected in parallel from junction 44 to ground. As the parts 12 begin impacting against the impact sensor 16 of FIGURE 1, the resulting impact pickup signal at the collector of transistor Q3 causes the charging of capacitor C6. This charge developed on capacitor C6 is distributed through diode D2 and resistor R14 to capacitors C7 and C8. The rate at which capacitors C7 and C8 are charged depends upon the value of resistors R14, and the values of resistors R17 and R18 since this charging current must overcome the current through these latter two resistors. Assuming that impacts continue, the voltage at junction 44 rises to a predetermined level in a predetermined time delay period so as to bias transistor Q4 off. The Schmitt trigger 43 goes into its triggered state where transistor Q5 is also cut off. Current flow through relay coil L1 is interrupted and relay K1 drops out. It will thus be seen that, with continuing impacts, a predetermined time delay is established from the time impacts of parts are first sensed to the time when the Schmitt trigger 43 is triggered to drop relay K1 out. For the purposes of the present disclosure it will be assumed that this predetermined time delay, called drop out delay, is adjusted to three seconds. If, for example, the machine 10 goes through one production cycle each second, then three parts are normally produced during this drop out delay. If, during one of these initial production cycles, a part is not produced, this drop out delay will extend longer than three seconds. The circuit parameters are preferably adjusted so that if three impacts are sensed in the time span of four production cycles, i.e., four seconds, the Schmitt trigger 43 will be triggered to drop out relay K1.

With relay K1 de-energized, the condition of its associated contacts are the opposite of their conditions shown in FIGURE 2. Specifically, relay contact K1a is closed, K1b is open, K1c is closed, K1d is closed and K1e is open. The signal indicating lamp 64 is de-energized while the counter 60 is energized to count machine production cycles.

Capacitor C8 is now disconnected from junction 44 and is connected to the negative 12 volt supply through relay contact K1c. As a result, capacitor C8 is discharged to a predetermined reference potential determined by the voltage divider action of resistors R21 and R22. Thus capacitor C8 has a predetermined reference charge on it for when it is again connected to junction 44. Since resistor R14 is now shunted by relay contact K1a, continued impact pickup signals cause capacitor C7 to be charged directly through relay contact K1a so as to further lower the biasing voltage at the base of transistor Q4 below the necessary off-biasing level by a prescribed amount. Thus the Schmitt trigger 43 is held in its triggered state, despite momentary interruptions in the continuing succession of impacts.

Once impacts cease altogether, the charge on capacitor C7 is no longer being replenished through diode D2. Capacitor C7 discharges to raise the voltage level at the base of transistor Q4. The rate of this voltage rise is adjusted by selection of the values of resistors R15 and R18 so as to provide a time delay, called pull in delay, equal the drop out delay. Thus, although impacts have ceased, the Schmitt trigger 43 remains in its triggered state to hold relay K1 de-energized. Relay contact K1d remains closed to continue enabling the counter 60 throughout this pull in delay. In the illustrated example, the counter 60 will accumulate three counts, corresponding to three machine production cycles, during this pull in delay of three seconds. It will thus be seen that since the two time delays are normally equal in duration, the overall count accumulated by the counter 60 will correspond to the number of successful machine production cycles when parts 12 were produced. Even in the situation, during an extended drop out delay when only three parts were produced in the initial four production cycles, the overall count accumulated in the counter 60 will be corrected since three production cycles are counted during the concluding pull in delay.

At the expiration of the pull in time delay, the transistors Q4 and Q5, comprising Schmitt trigger 43, go into conduction and relay K1 is operated. The counter 60 is disabled while relay contact K1e closes to energize the signal indicating lamp 64. The signal indicating lamp 64 signals to the attendant that the machine 10 is not producing parts and that his attention is required.

Since, while the Schmitt trigger 43 is triggered, capacitor C7 is charged to a voltage in excess of the required off biasing voltage at the base of transistor Q4, temporary interruptions of impacts for periods of time less than the predetermined pull in time delay will not allow the Schmitt trigger to revert to its normal state. In these instances the counter 60 will count those machine production cycles during which a part was not produced. From experience however, it is found that these temporary interruptions in past production are infrequent and thus the fact that the count accumulated in the counter is somewhat in excess of the number of parts actually produced is of little matter as far as production records are concerned.

As the Schmitt trigger reverts to its normal state permitting the relay K1 to pull in, the contact conditions are again as shown in FIGURE 2. Capacitor C8 is reconnected directly to junction 44 through relay contact K1b. The reference charge developed across this capacitor during the period when the Schmitt trigger 43 was triggered provides a base charge level from which this capacitor along with capacitor C7 begins charging to define the drop out delay when impacts resume.

My invention thus provides an apparatus for monitoring automated production machinery. The impact sensor 16 provides usable signal indications that parts are being produced even though the parts are of quite small physical size. The monitoring apparatus responds to provide a signal indication only in those situations where the production machinery is out of order and requires attention so that corrective measures can be promptly instituted. Moreover, the apparatus of my invention operates to selectively enable the counter 60 so as to effectively count with acceptable accuracy the number of parts actually produced.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Apparatus for monitoring automated production machinery producing a normal succession of articles, said apparatus comprising, in combination:
   (A) a sensor disposed to detect said articles produced by said production machinery, such sensor
      (1) operating to produce a succession of pickup signals corresponding to the succession of article;
   (B) a trigger circuit
      (1) operating to a first state in response to said pickup signals, and
      (2) operating to a second state in response to the absence of pickup signals;
   (C) delay circuit means responsive to said pickup signals for
      (1) providing a first time delay in the operation of said trigger circuit from its second state to its first state, and
      (2) providing a second time delay in the operation of said trigger circuit from its second state;
   (D) signal indicating means enabled by said trigger circuit when in its second state to provide a signal indication; and
   (E) a counter adapted to count production cycles of said machinery, said counter
      (1) being enabled by said trigger circuit when in its first state to count machine production cycles thereby providing a count substantially corresponding to the number of articles produced.

2. The apparatus defined in claim 1, wherein:
   (C)(3) said first time delay is equal to said second time delay for normal successions of articles.

3. Apparatus for monitoring automated production machinery producing a succession of articles, said apparatus comprising, in combination:
   (A) a sensor for detecting articles produced by said production machinery, said sensor
      (1) operating to develop a succession of pickup signals corresponding to a succession of articles;
   (B) a trigger circuit having
      (1) a first state, and
      (2) a second state;
   (C) delay circuit means responsive to said pickup signals for
      (1) delaying the operation of said trigger circuit from its second state to its first state for a first time delay period corresponding to a predetermined succession of said pickup signals, and
      (2) delaying the operation of said trigger circuit from its first state to its second state upon interruption of said succession of impact pickup signals for a second time period substantially equal to said first time period;
   (D) a relay controlled by said trigger circuit, said relay including
      (1) control relay contacts operating to control said delay circuit means to provide said first time delay period when said trigger circuit is in its second state and said second time delay period when said trigger circuit is in its first state,
      (2) enabling relay contacts;
   (E) signal indicating means enabled by said enabling relay contacts to provide a signal indication when said trigger circuit is in its second state; and
   (F) a counter adapted to count machine production cycles of said machinery where each production cycle is capable of producing a known quantity of articles, said counter
      (1) being enabled by said enabling relay contacts to count machine production cycles only when said trigger circuit is in its first state,
      (2) whereby the count accumulated in said counter substantially corresponds to the number of articles produced.

4. The apparatus defined in claim 3 wherein:

(A)

(2) said sensor including a flexible plate disposed such that said articles impact against it, and
   (3) a piezoelectric transducer affixed to said plate, said transducer
      (a) operating in response to the mechanical vibrations induced in said plate by the impact of articles against it to develop pickup signals.

5. Apparatus for monitoring automated production machinery producing a succession of articles, said apparatus comprising, in combination:
   (A) a sensor for detecting articles produced by said production machinery, said sensor including
      (1) a flexible plate disposed such that said articles impact against it, and
      (2) a piezoelectric transducer affixed to said plate, said transducer
         (a) operating in response to the impact of each article against said plate to develop a pickup signal;
   (B) amplifier circuit means for amplifying said pickup signals;
   (C) a trigger circuit having
      (1) a first state, and
      (2) a second state;
   (D) delay circuit means including
      (1) first and second capacitors, and
      (2) first and second resistors;
   (E) signal indicating means;
   (F) a counter adapted to count machine production cycles of said machinery where each machine production cycle produces a known quantity of articles; and
   (G) a relay operating according to the state of said trigger circuit, said relay including
      (1) a first contact,
         (a) being open when said trigger circuit is in its second state to cause said first and second capacitors to be charged through said first resistor at a predetermined rate by a succession of pickup signals such that said trigger circuit is triggered to its first state after a first time delay, and
  (b) being closed when said trigger circuit is in its first state to cause said first capacitor to be charged directly by said pickup signals whereby said trigger circuit is held in its first state after pickup signals cease for a second time delay substantially equal to said first time delay as said first capacitor discharges through said second resistor to trigger said trigger circuit to its second state,
(2) a second contact
  (a) connecting said second capacitor to said first resistor when said trigger circuit is in its second state,
  (b) being open when said trigger circuit is in its first state to disconnect said second capacitor from said first resistor,
(3) a third contact
  (a) connecting said second capacitor to be charged to a reference voltage when said trigger circuit is in its first state,
(4) a fourth contact
  (a) enabling said signal indicating means when said trigger circuit is in its second state, and
(5) a fifth contact
  (a) enabling said counter when said trigger circuit is in its first state to count machine production cycles so as to provide a count substantially corresponding to the number of articles actually produced.

References Cited

UNITED STATES PATENTS 2,659,881  11/1953  Bogot _____ 340—361
3,015,977   1/1962  Stegink _____ 340—361

THOMAS B. HABECKER, *Primary Examiner.*

U.S. Cl. X.R.

340—267